United States Patent [19]

Carter

[11] Patent Number: 4,759,701
[45] Date of Patent: Jul. 26, 1988

[54] VENTING UNIT FOR A RUBBER ARTICLE FORMING MOLD HAVING VENTS

[75] Inventor: Russell W. Carter, Des Moines, Iowa

[73] Assignee: Corn States Metal Fabricators, Inc., Des Moines, Iowa

[21] Appl. No.: 98,306

[22] Filed: Sep. 18, 1987

[51] Int. Cl.$^4$ .............................................. B29B 15/00
[52] U.S. Cl. .................................. 425/28.1; 425/35; 425/47; 425/812
[58] Field of Search .................. 425/812, 28 R, 34 R, 425/35, 47, 84, 85

[56] References Cited

U.S. PATENT DOCUMENTS

| | | | |
|---|---|---|---|
| 4,351,789 | 9/1982 | Sidles | 425/812 |
| 4,492,554 | 1/1985 | Carter | 425/383 |
| 4,662,833 | 5/1987 | Carter | 425/812 |

FOREIGN PATENT DOCUMENTS 922788  4/1963  United Kingdom ................ 425/812

*Primary Examiner*—Bernard Nozick
*Attorney, Agent, or Firm*—Rudolph L. Lowell

[57] ABSTRACT

A venting unit is inserted in a press fit within the air vent of a rubber article forming mold and is comprised of a cylindrical body member with an axial bore having a reduced outer end section forming an air inlet open to the mold cavity. Received for reciprocal axial movement within the bore between an inlet closed position in abutting engagement with the outer end section and an inlet open position removed from the outer end section is a heat absorbing piston or disc. The opposite or inner end section of the bore receives a vented plug in a press fit to form a radially inwardly projected shoulder and a spring is held in compression between the disc and the shoulder of the vented plug. During expansion of the rubber article, pressurized air in the mold cavity urges the disc to its inlet open position and is vented to the atmosphere. As the rubber article reaches its final form, venting of air is completed and any uncured rubber in the air inlet contacts the disc to set the rubber within the confines of the air inlet. The rubber in the air inlet forms a part of the molded article which, upon its removal from the mold, will exhibit only a minimal surface irregularity.

5 Claims, 1 Drawing Sheet

VENTING UNIT FOR A RUBBER ARTICLE FORMING MOLD HAVING VENTS

BACKGROUND OF THE INVENTION

The invention relates generally to venting units for venting air from a rubber article forming mold and, more specifically, to venting units having a yieldable valve element for venting air from a tire mold.

In the forming of vehicle tires, it is desirable that the tire side wall be free of any projected rubber pins, impressions, depressions, or other surface irregularities. The forming of the pins or needles is usually the result of the uncured tire band, in the final forming operation of the tire, being forced into the air release vents or passages which have terminal ends open to the inner surface of the tire forming cavity of the mold. For economical purposes, the pins are not removed and thus give to the tire an unfinished or hairy appearance.

A number of attempts have been made to avoid surface irregularities on the tire side wall by the use of valve units. In British Pat. No. 922,788, issued Apr. 3, 1963, a valve body is movably mounted in a vent for movement to a vent closing position by the expansion of the band against the cavity side wall.

The release of air from the mold cavity through vents in U.S. Pat. No. 3,842,150, is controlled by valves that are actuated in response to a selective application of pressure on the valves. Appreciable time and expense is involved in the manufacture of the valves and in the control system for synchronizing the flow of variable pressure air through the valves with the steps in the tire forming operation.

In U.S. Pat. No. 4,492,554, the venting unit for the tire mold is engaged and moved by an expanding tire band to a vent closing position to form a smooth surface continuous with the inner surface of the tire forming cavity and is yieldably urged to a vent opening position by a spring means. Frequent cleaning of the venting units, however, is required to ensure their proper operation resulting in down time losses of the molding equipment.

SUMMARY OF THE INVENTION

The venting unit of this invention is readily applicable to commercially available and existing tire forming machines without requiring any appreciable machining of the mold to accommodate the venting units which are adaptable to be inserted in a press fit within the mold cavity end portion of an air vent. The venting unit of this invention is economical in cost and efficient in operation over a long service life, without requiring frequent cleaning of the mold cavity or air vents or trimming of pins from the finished tire. Because pins or other visible rubber portions are not formed, the venting unit can be used in air vent passages that are curved or angular which would prevent a separated pin or residual portion from traveling through the air vent passage.

Each venting unit includes a tubular cylindrical body member having a reduced diameter air inlet at the outer end thereof of an axial length less than the reduced diameter. A heat absorbing disc or piston is movable within the body member between a position closing the air inlet and a position opening the air inlet to permit venting of air through the venting unit. A vented plug is received at the inner end of the body member and a spring within the body member in compression between the disc and the plug yieldably urges the disc toward the inlet closing position therefor. Upon expansion of the uncured rubber article, the resultant pressurized air in the mold cavity initially moves the disc to the inlet open position to be vented from the mold. Upon completion of the venting of air, the spring urges the disc to the inlet closed position. Expanding uncured rubber that fills the inlet contacts the disc, the heat absorbing capacity and thermal conductivity of which acts to set the rubber to prevent its expansion outside the confines of the air inlet.

DETAILED DESCRIPTION OF A PREFERRED EMBODIMENT

Figure 1:
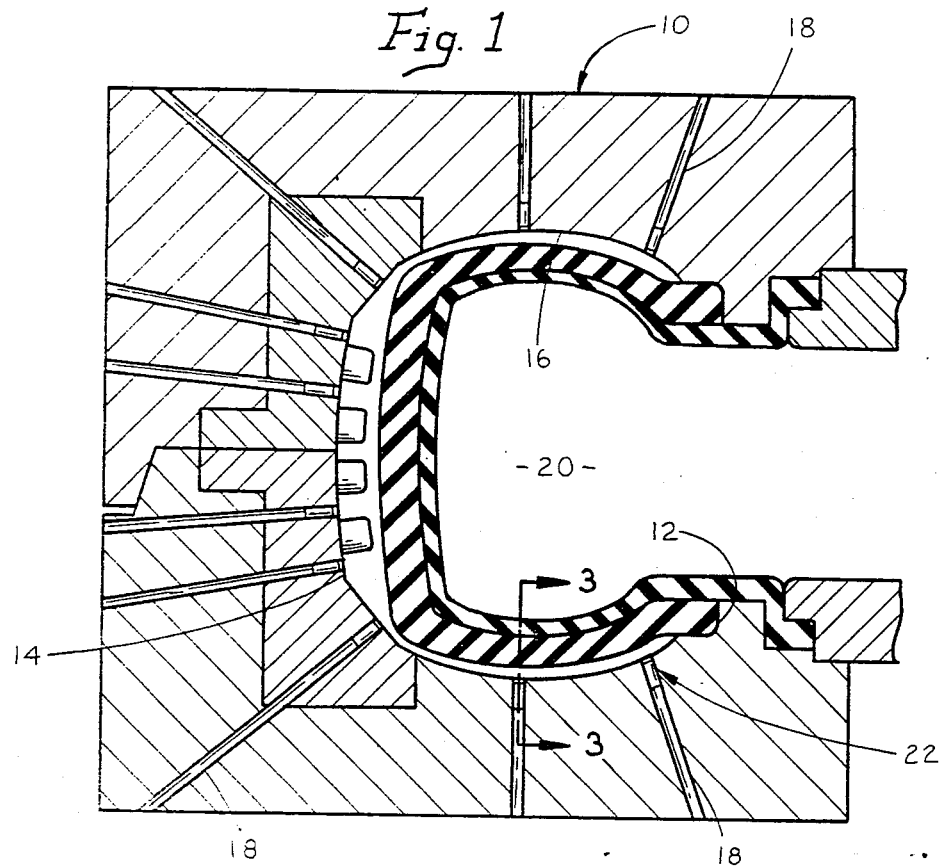
FIG. 1 is a transverse sectional view of a tire mold showing the venting units of this invention inserted in the vents thereof.

With reference to FIG. 1, there is illustrated a metal mold 10 for molding a pneumatic tire 12, the mold 10 including a tread portion 14 and a side wall portion 16. The mold is of a usual two-piece construction used in a tire forming machine such as described in U.S. Pat. No. 4,492,554. The mold 10 is formed with a plurality of vents 18 each of which is open at one end to the atmosphere and at its other end to the mold cavity 20. The vents 18 release from the mold cavity 20 air that would otherwise be trapped therein as the uncured rubber tire band is forced against the cavity wall. A plurality of venting units 22 of this invention prevent excessive rubber protrusions or surface irregularities from forming in the air vents during the molding operation. For this purpose, and as shown in FIG. 1, a venting unit 22 is received in a press fit within the cavity or outer end portion of an air vent 18.

Figure 2:
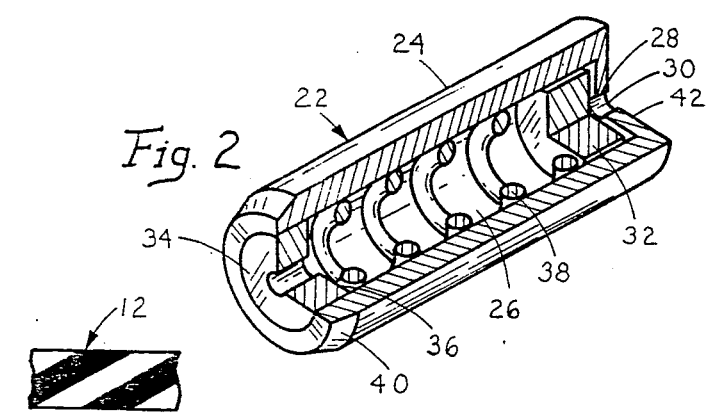
FIG. 2 is an enlarged perspective view of a venting unit with a part thereof removed to show more clearly its construction.
Figure 3:
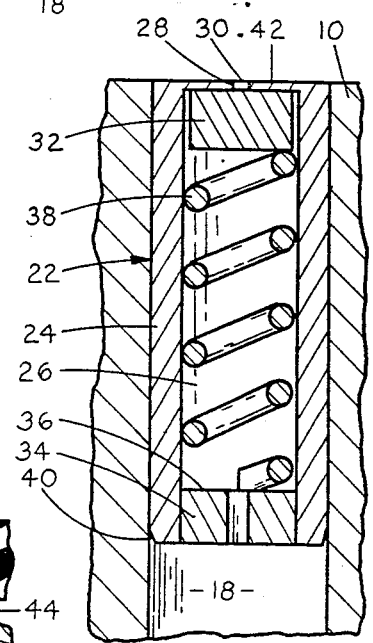
FIG. 3 is an enlarged sectional view taken along the line 3—3 in FIG. 1.

Each venting unit 22 (FIGS. 2 and 3) consists of a cylindrical body member 24 formed with a central bore 26 having a reduced outer end section 28 to form an air inlet 30 open to the mold cavity 20.

Received within the bore 26 is a floating piston or disc 32 of a size to permit relative axial or longitudinal motion thereof within the bore 26. The diameter of the disc 32 is sufficiently less than the diameter of the bore 26 to permit air to pass between the outer peripheral surface of the disc 32 and the inner peripheral surface of the bore 26.

A vented plug 34 is inserted in a press fit into the inner or opposite end of the body member 24 thereby forming a radially inwardly projected shoulder 36. A spring 38 is held in compression between the disc 32 and the shoulder 36 to yieldably urge the disc 32 into abutting closing engagement with the air inlet 30.

The outer diameter of the body member 24 is of a size relative to a vent 18 providing for its insertion in a press fit within the cavity end of the vent 18. The insertion is facilitated by the provision of a bevel or chamfer 40 formed on the leading or inner end of the body member 24. Each venting unit 22 is received over its full length into an associated vent 18 so that the outer end surface or face 42 is substantially flush or continuous with the surface of the cavity side wall 16.

Figure 4:
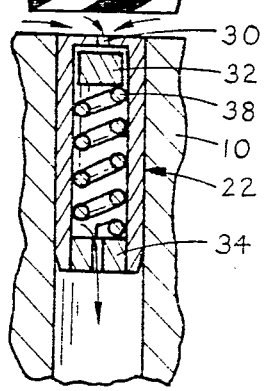
FIG. 4 is a diagrammatic illustration showing air being vented through the venting unit.

In use, and as illustrated in FIG. 4, as the uncured rubber of the tire 12 is expanded under pressure of approximately 300 psi to its final form within the mold cavity 20, pressurized air will be present in the air inlet 30. The pressurized air will urge the disc 32 in a direction to further compress the spring 38. The spring constant of the spring 38 is selected to permit movement of the disc 32 by the pressurized air from its inlet closed position in engagement with the reduced outer end section 28 to an inlet open position wherein air will be vented through the air inlet 30, around the disc 32, and through the vented plug 34 to the atmosphere as indicated by arrows.

Figures 5, 6:
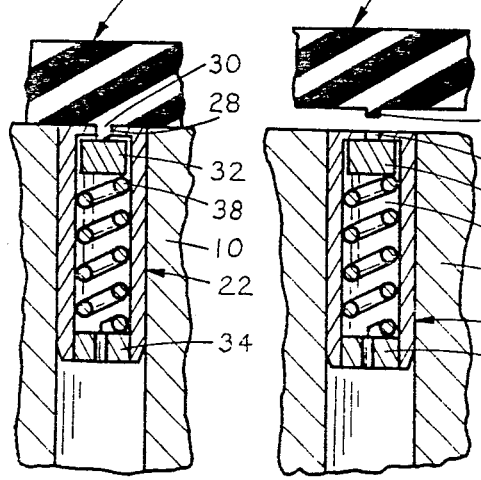
FIG. 5 is a diagrammatic illustration showing a portion of the exterior surface of the formed rubber article expanding into contact with a movable piston or disc of the venting unit.
FIG. 6 is illustrated similarly to FIG. 5 and shows the removal of the article from the mold without the formation of a pin-shaped surface irregularity.

Upon exhaustion of air from inside the cavity, a portion of uncured rubber of the tire 12 at the venting unit 22 will enter the air inlet 30, as illustrated in FIG. 5. The uncured rubber, which is at a temperature of approximately 370° F., will come into contact with the disc 32 which has been moved by spring 38 against the air inlet 30 at the reduced outer end section 28. The temperature of the disc 32 is substantially the same as the cavity wall of the mold, which is typically maintained at a temperature of approximately 370° F. Accordingly, the rubber in the inlet on contact with the disc 32 will be heated by the absorption of heat from the disc. The disc 32 has a sufficient heat capacity relative to that of the rubber in the air inlet 30, so that the rubber in the inlet will set as it comes into contact with the disc 32. This setting action will prevent rubber from expanding outside the confines of the air inlet 30 into the bore 26 of the body member 24.

On removal of the cured tire from the mold cavity 20, and as illustrated in FIG. 6, the volume of rubber in the air inlet 30 will adhere to the cured tire and be removed from the venting unit 22 and the mold cavity 20. Due to the reduced diameter and axial length of the air inlet 30, the resulting surface irregularity 44 on the surface of the cured tire will be very minimal so as not to impair the appearance of the tire 12. The appearance of surface irregularities can be further reduced by the use of blemish paint to coat and smooth the cavity walls prior to the tire molding operation.

The air inlet 30 has a diameter of about 0.010 inches to about 0.015 inches and an axial length of about 0.010 inches to 0.015 inches. The disc 32 is high carbon, 303 stainless steel and has a diameter of 0.080 inches and an axial length of 0.125 inches. The spring 38 is made of 0.007 inches diameter stainless steel wire and exerts a force of approximately 0.8 ounces on the disc 32. The distance between the shoulder 36 and the inner surface of the disc 32 in its inlet closed position is 0.125 inches.

A typical tire mold pressure of 300 psi will result in movement of the disc to its inlet open position.

Although the invention has been described with respect to a preferred embodiment thereof, it is to be understood that it is not to be so limited since changes and modifications can be made therein which are within the full intended scope of this invention as defined by the following claims.

I claim:

1. In a rubber article forming mold having a cavity for forming a rubber article and having plural vents for releasing air which would otherwise be trapped in the mold cavity as the uncured rubber is expanded in the cavity to the final expanded condition therefor against the cavity side wall, the improvement comprising a venting unit comprising:
   (a) a cylindrical body member having an axial bore and received in a press fit within an air vent with the surface at an outer end thereof continuous with the surface of the cavity side wall;
   (b) an air inlet at the outer end of said body member of a diameter reduced relative to said bore and of an axial length less than said diameter;
   (c) a heat absorbing disc within said bore movable into and out of an air inlet closing position;
   (d) a radially inwardly projected shoulder within the bore at the opposite end of said body member; and
   (e) means in said bore between said disc and said shoulder for yieldably retaining the disc in said air inlet closing position;
   (f) said disc, in response to the exhaust of trapped air from within the cavity, being movable to an air inlet open position against the action of said yieldable means and, on completion of venting of air, being movable to an air inlet closed position by said yieldable means substantially concurrently with the expansion of uncured rubber into said air inlet, said uncured rubber on contact with said disc being confined within said air inlet and cured.

2. The rubber article forming mold according to claim 1, wherein:
   (a) said disc has a volume which is at least one hundred times the volume of said air inlet.

3. The rubber article forming mold according to claim 1, wherein:
   (a) said air inlet has an axial length of about 0.010 inches and a diameter from about 0.010 inches to 0.015 inches.

4. The rubber article forming mold according to claim 1, wherein:
   (a) said disc has a heat capacity and thermal conductivity sufficient to set the rubber within the confines of said air inlet so as to prevent the further expansion of the rubber beyond the confines of the air inlet.

5. The rubber article forming mold according to claim 1, wherein:
   (a) said radially inwardly projected shoulder is formed by a vented plug received in a press fit within the bore at the opposite end of said body member.

* * * * *